(12) United States Patent
Hatcher et al.

(10) Patent No.: US 8,455,699 B2
(45) Date of Patent: Jun. 4, 2013

(54) PRODUCTION AND SEPARATION OF GLYCEROL-RELATED PRODUCTS USING VARIOUS FEED STOCKS

(75) Inventors: Patrick G. Hatcher, Suffolk, VA (US); Zhanfei Liu, Norfolk, VA (US); Elodie Salmon, Norfolk, VA (US)

(73) Assignee: Old Dominion University Research Foundation, Norfolk, VA (US)

( * ) Notice: Subject to any disclaimer, the term of this patent is extended or adjusted under 35 U.S.C. 154(b) by 0 days.

(21) Appl. No.: 13/569,621

(22) Filed: Aug. 8, 2012

(65) Prior Publication Data

US 2012/0323044 A1 Dec. 20, 2012

Related U.S. Application Data

(63) Continuation-in-part of application No. 13/204,884, filed on Aug. 8, 2011, which is a continuation-in-part of application No. 12/336,707, filed on Dec. 17, 2008, now Pat. No. 8,080,679.

(60) Provisional application No. 61/015,926, filed on Dec. 21, 2007, provisional application No. 61/535,525, filed on Sep. 16, 2011, provisional application No. 61/558,044, filed on Nov. 10, 2011.

(51) Int. Cl.
*C07C 43/00* (2006.01)

(52) U.S. Cl.
USPC .......................... 568/679; 568/672; 568/680

(58) Field of Classification Search
USPC .......................... 568/679, 672, 680
See application file for complete search history.

(56) References Cited

U.S. PATENT DOCUMENTS

| 7,126,032 B1 | 10/2006 | Aiken |
| 2009/0119979 A1 | 5/2009 | Mullen |
| 2009/0158638 A1 | 6/2009 | Hatcher et al. |
| 2012/0323044 A1* | 12/2012 | Hatcher et al. ............ 568/679 |

FOREIGN PATENT DOCUMENTS

| EP | 2159212 A1 | 3/2010 |
| JP | 2009227638 A  * | 10/2009 |
| WO | 2007061325 A1 | 5/2007 |

OTHER PUBLICATIONS

English translation of JP 200-227638.*
Notification of Transmittal, the International Search Report and the Written Opinion of the International Searching Authority dated Feb. 22, 2013 from the corresponding International Application No. PCT/US2012/049983 filed Aug. 8, 2012.

* cited by examiner

*Primary Examiner* — Deborah D Carr
(74) *Attorney, Agent, or Firm* — Young Basile

(57) ABSTRACT

Disclosed are processes for producing glycerol-related products. One process for producing glycerol-related products comprises introducing glycerol and an alkylation reagent to a substantially oxygen free environment. Another process for producing glycerol-related products comprises introducing a glycerol and tetramethylammonium hydroxide to a substantially oxygen free environment.

21 Claims, 12 Drawing Sheets

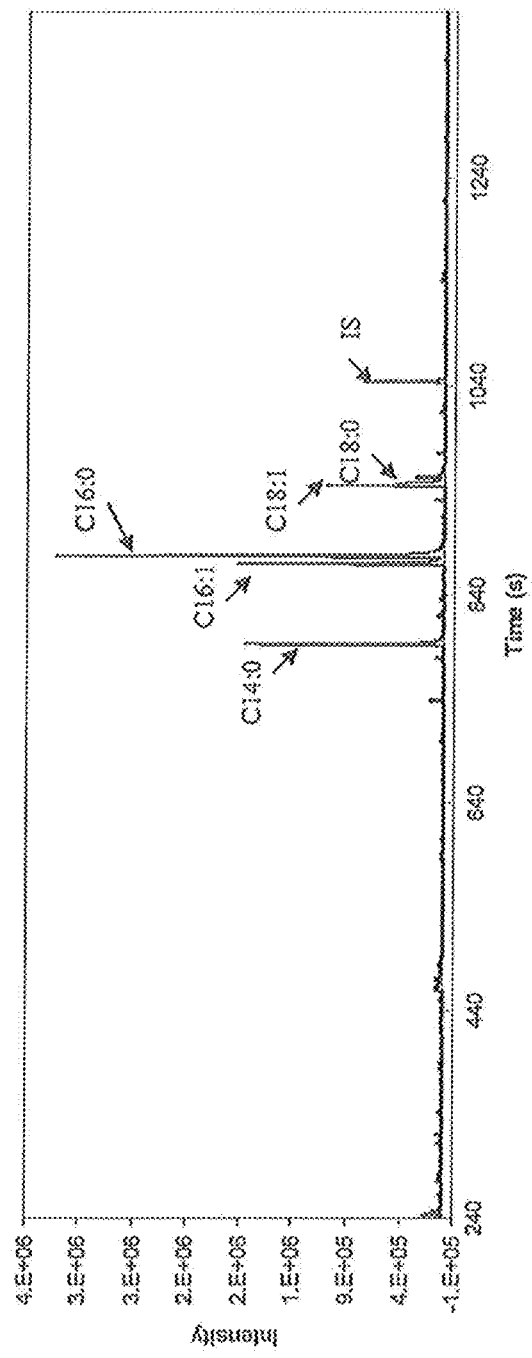
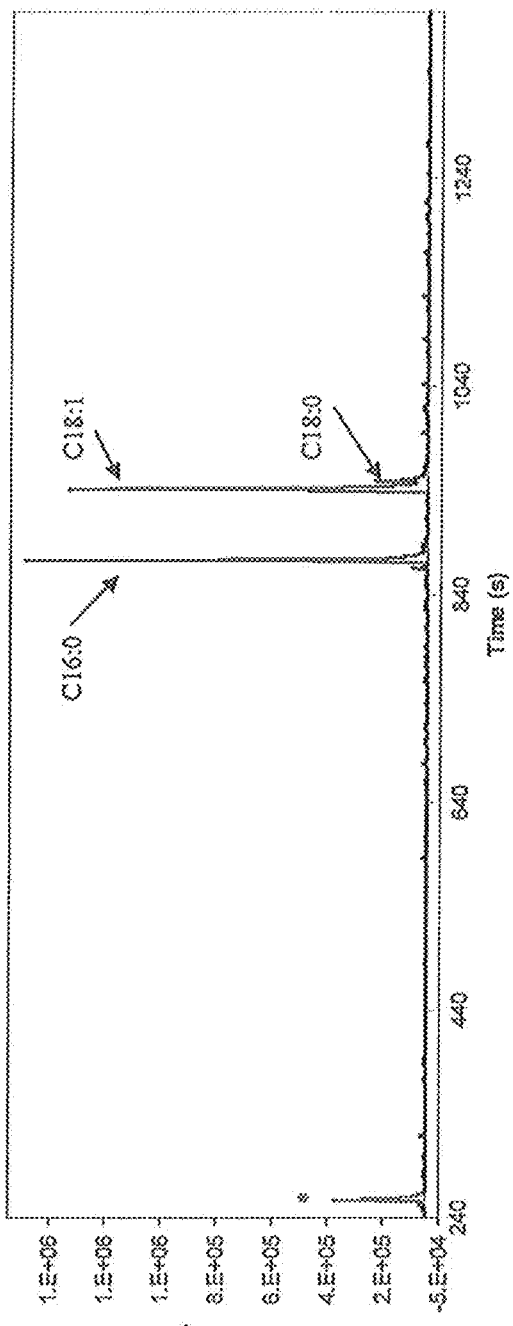
FIG. 5A
FIG. 5B

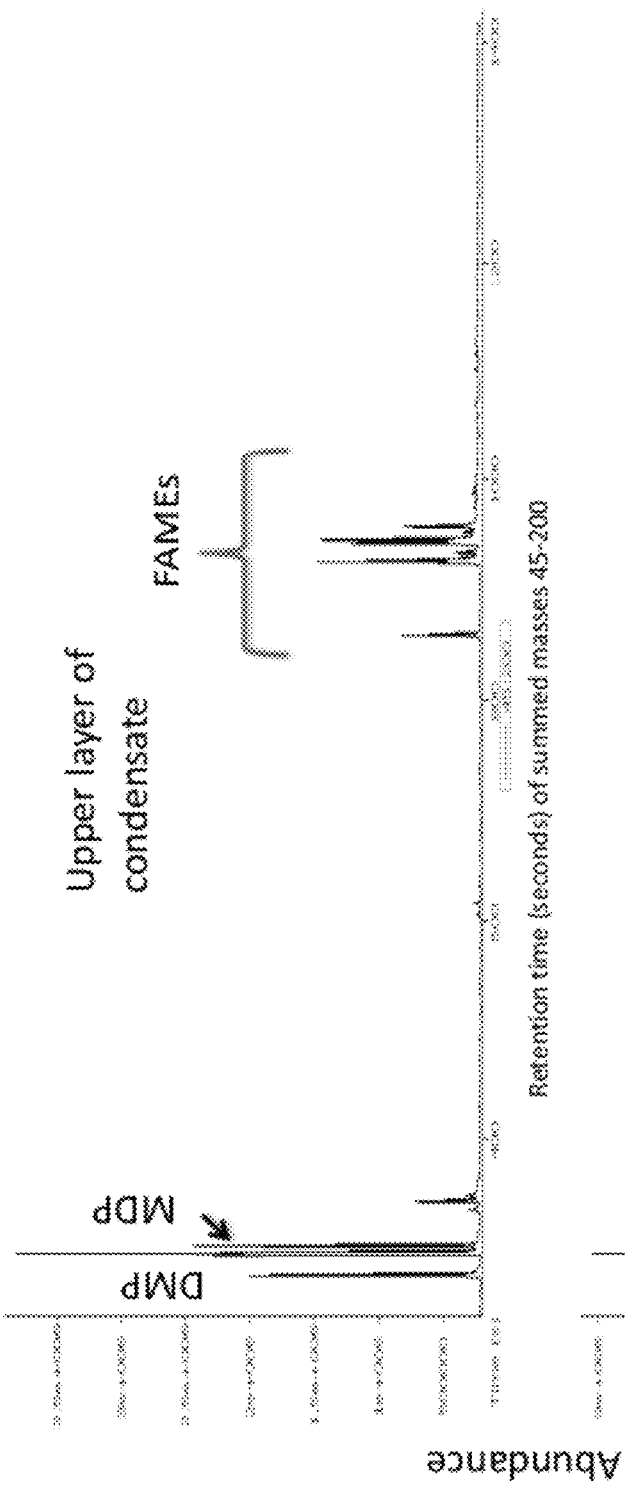
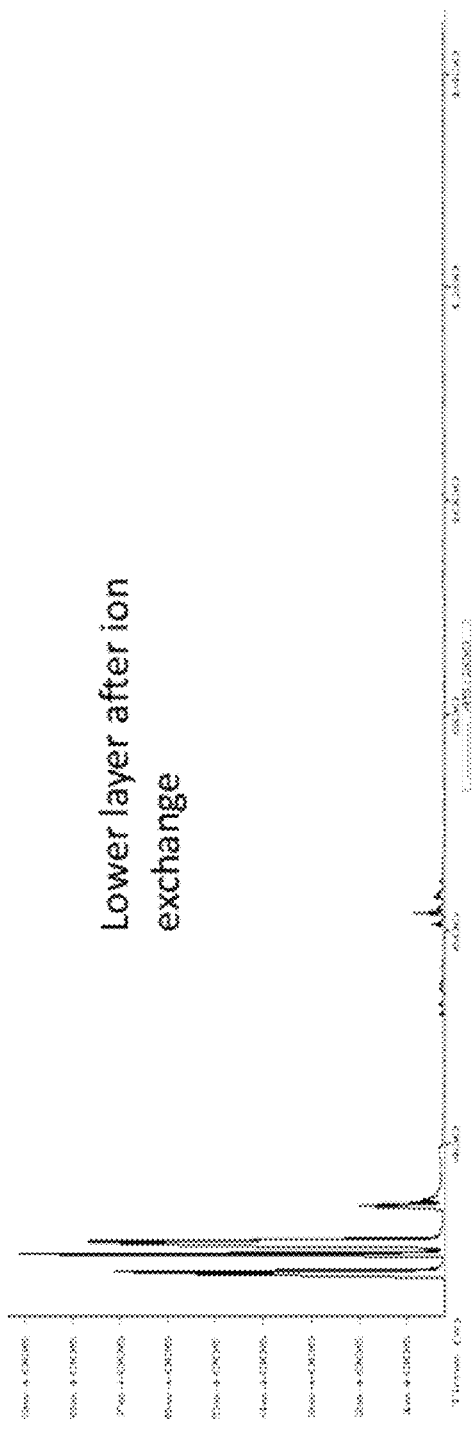
FIG. 7A
FIG. 7B

US 8,455,699 B2

PRODUCTION AND SEPARATION OF GLYCEROL-RELATED PRODUCTS USING VARIOUS FEED STOCKS

CROSS-REFERENCE TO RELATED APPLICATIONS

This application is a continuation-in-part of U.S. patent application Ser. No. 13/204,884 filed on Aug. 8, 2011, which claims priority to Provisional Patent Application Ser. No. 61/015,926 filed on Dec. 21, 2007 and is a continuation-in-part of U.S. patent application Ser. No. 12/336,707 filed on Dec. 17, 2008, all incorporated herein by reference in their entirety. This application claims priority to U.S. Provisional Patent Application Ser. No. 61/535,525 filed on Sep. 16, 2011 and U.S. Provisional Patent Application Ser. No. 61/558,044 filed on Nov. 10, 2011, both of which are incorporated herein by reference.

TECHNICAL FIELD

The invention disclosed herein relates in general to the production of high value glycerol related co-products from a high temperature reaction of an alkylation reagent with various feed stocks.

BACKGROUND

The recent emphasis on finding alternative energy sources to fuel the energy needs of the United States and the world is leading to an accelerated search for new fuels or new sources of fuel. Producing a liquid fuel from biomass, or biofuel, is an important focus of many alternative energy strategies. Ethanol production from plant biomass is one example of this. Another example of a newer fuel is biodiesel. Refined vegetable oils have been the typical starting materials for the production of biodiesel. Biodiesel is an alternative, non-toxic, biodegradable and renewable diesel fuel. These characteristics of biodiesel reduce the emission of carbon monoxide, hydrocarbons, and particulate matter in the exhaust gas compared to diesel fuel.

The production of non-alcohol biofuels from terrestrial and aquatic biomass primarily involves the conversion of trigycerides within the biomass to either fatty acid methyl esters by trans-esterification or to hydrocarbon-based fuels by various catalytic high-temperature processes which convert the oils to hydrocarbon-based fuels. Most of focus has been on the triglycerides. The conventional method for transesterifying the triglycerides to produce methyl esters, which can be recovered and marketed as FAME (fatty acid methyl ester) biofuel, is reaction with methanol in the presence of a base catalyst, usually sodium hydroxide, at temperatures not exceeding 100° C. In this reaction, the three-carbon backbone of the triglycerides is converted to glycerol (1,2,3-trihydroxypropane). Large-scale production of biofuel by this approach has and will lead to large excesses of glycerol that currently has very little value in commercial markets.

SUMMARY

Disclosed herein are methods of producing glycerol-related products. One process for producing glycerol-related products as disclosed herein comprises introducing a biomass and an alkylation reagent to a substantially oxygen free environment; hydrolyzing at a temperature at or above 200° C. one or more lipid glycerides in the biomass; methylating one or more fatty acids in the biomass with methyl groups from the alkylation reagent, wherein the hydrolyzing and methylating occur contemporaneously; separating a lower phase from an upper phase of a resulting condensate, the lower phase comprised of biodiesel; acidifying the upper phase; separating the acidified upper phase into biodiesel dissolved in methanol and methoxylated glycerols dissolved in methanol; removing the methanol from both the biodiesel and the methoxylated glycerols; and separating the biodiesel from the methoxylated glycerols.

Another process disclosed herein for producing glycerol-related products comprises introducing glycerol and an alkylation reagent to a substantially oxygen free environment.

Yet another process for producing glycerol-related products comprises introducing a glycerol and tetramethylammonium hydroxide to a substantially oxygen free environment.

BRIEF DESCRIPTION OF THE DRAWINGS

The description herein makes reference to the accompanying drawings wherein like reference numerals refer to like parts throughout the several views, and wherein:

FIG. 2A shows the yield compared to temperature, and FIG. 2B shows the yield compared to amount of tetramethylammonium hydroxide;

FIGS. 5A and 5B show GCTOF-MS ion chromatograms of biofuel from an algal sample and biofuel from soybean oil, respectively;

FIG. 7A shows the total ion chromatograms (masses 45-200) of the upper phase of biodiesel total condensate from the reaction of TMAH with soybean oil at 300° C. (upper trace);

FIG. 7B shows the phase-separated lower layer of the fraction shown in the upper trace that has been treated with ion exchange resin (lower trace), with the FAMEs removed by this phase separation.

DETAILED DESCRIPTION OF EMBODIMENTS

Disclosed herein is a process for directly converting feed stocks to biofuel and methoxylated glycerols without a glycerol by-product. The one-step process involves thermochemolysis with a single alkylation reagent at a sufficient temperature under substantially oxygen-free conditions and at ambient pressures. Also disclosed is a process for conversion of glycerin and crude glycerin to methoxylated glycerol products, the crude glycerin being the byproduct of conventional processes that produce biofuel and comprises mainly glycerol with residual biofuel, soaps, salts, catalyst and other impurities used in the conventional processes. Further disclosed is a process to separate the methoxylated glycerols from biofuel.

As used herein, "biofuel" refers to any fuel, fuel additive, aromatic and aliphatic compound derived from a biomass disclosed herein. As used herein, "reaction" is intended to cover single step and multi-step reactions which can be direct reactions of reactants to products or may include one or more intermediate species which can be either stable or transient.

Figure 1:
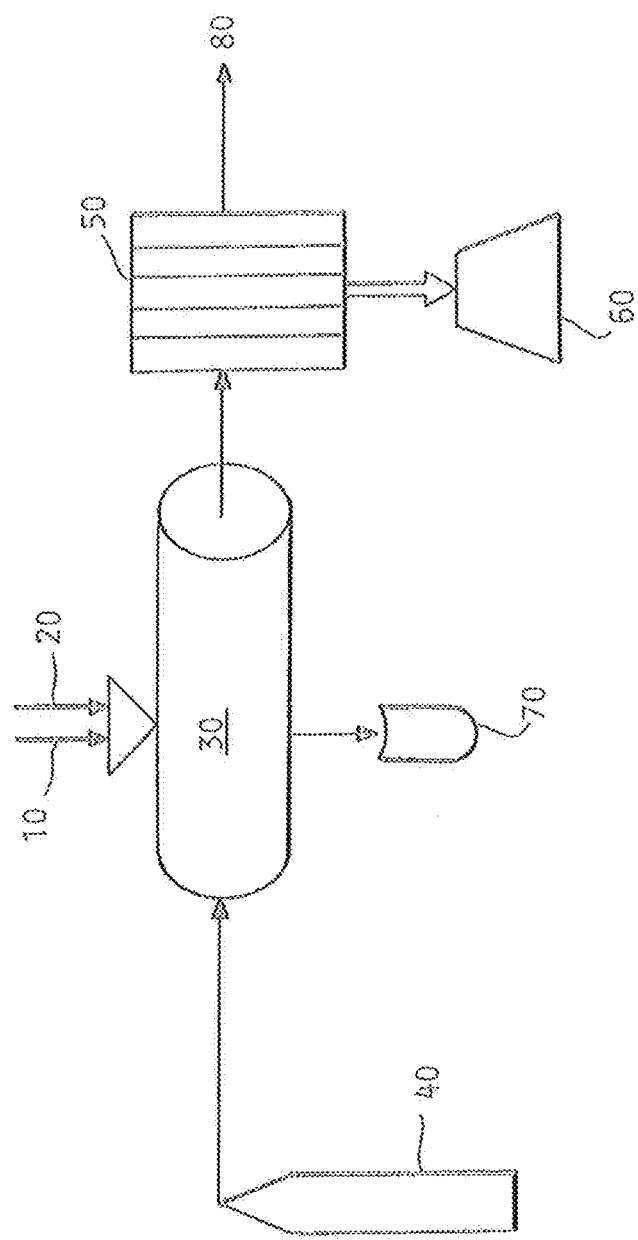
FIG. 1 is a schematic diagram of an embodiment of the conversion process.

An embodiment of the direct conversion of biomass to biofuel is depicted in FIG. 1. The reactor feed stock comprises a dried or partially dried biomass 10 and an alkylation reagent 20. The feed stock can be mixed and loaded into a reactor 30. The reactor 30 has temperature control (not shown) to maintain the reactor 30 at a desired temperature. Inert gas 40 flows through the reactor to maintain a substantially oxygen free environment. At the desired temperature, alkylation occurs. The lipid triglycerides of the dried or partially dried biomass 10 are hydrolyzed and the fatty acids are alkylated, directly producing fatty acid alkyl esters (FAAEs), the essential biofuel component. The following is the general reaction equation:

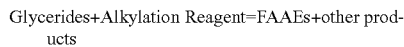

Glycerides+Alkylation Reagent=FAAEs+other products

The volatile FAAEs produced in the reaction are recovered. In this embodiment, recovery is shown via a condenser 50. The FAAEs are recovered as biofuel 60 by well-known methods such as condensation. By-products such as glycerol-related by-products, water or other water soluble compounds are separated by density in the reactor 70 or by either density or volatility in the condenser 80.

The individual elements of the process will now be described in detail.

As used herein, "biomass" means material harvested from a plant or plants. Depending on the particular plant or plants, the harvested material is used directly as reactor feedstock or processed further by well-known methods to convert it into reactor feedstock. For example, algae can be used directly, partially dried, completely dried, or dried and partially reconstituted in water.

The biomass may comprise plants that have been conventionally studied in an effort to obtain biofuel from the extracted oil. Non-limiting examples of such plants are corn, sunflower, olive, soybeans, rapeseed, wheat, sugar beet, sugar cane, jatropha, palm, sorghum, cassava, hemp, algae and the like. Dried or partially dried biomasses of such plants can be used in the embodiments herein. These plants contain the oily glycerides necessary for the direct conversion. Such plants also include those described in U.S. Pat. Nos. 5,525,126; 6,855,838; and 6,965,044 and U.S. Patent Application Publication Nos. 2007/0048848; and 2003/0158074.

Microalgae, prevalent in both fresh and marine waters, are remarkable and efficient biological factories capable of producing substantially more lipids than most typical land plants. For example, *Botryococcus braunii*, a strain of green microalgae, contains around 30-45% of oil content in their dried biomass. Algal culturing requires significantly less land than other plant feed stocks, which can affect agricultural production. Microalgae are capable of producing about thirty times the amount of oil per unit area of land, compared to terrestrial crops. The per unit area yield of oil from algae is estimated to be from between 5,000 to 20,000 gallons per acre, per year (4.6 to 18.4 l/m$^2$ per year); this is 7 to 30 times greater than the next best crop, Chinese tallow (699 gallons). See *An in-depth look at biofuels from algae*, Jan. 19, 2007, http://biopact.com/2007/01/in-depth-look-at-biofuels-from-algae.html and John Sheehan, Terri Dunahay, John Benemann, Paul Roessler "*A look back at the U.S. Department of Energy's Aquatic Species Program: Biofuel from Algae*," Close-out Report, U.S. Dept. of Energy (July 1998). Due to the high growth efficiency of microalgae, the microalgae can efficiently recycle the inorganic carbon released from the petroleum combustion. For these reasons, algae are an ideal source from which to produce biofuel.

Higher plants, e.g., terrestrial plants, have been known to contain aliphatic biopolymers that can yield hydrocarbons upon reacting. For example, the leaves of many deciduous and non-deciduous plants contain an aliphatic polyester biopolymer called cutin. Some leaves also contain a biopolymer called cutan that shares an analogy with algaenan, the bio-polymer found in algae. Some plants contain another aliphatic biopolymer called suberin in their bark. An analogous polymer to algaenan found in such bark is suberan. All of these polymers share some common chemistry in that they are highly aliphatic and appear to be made up of fatty acid-like substructures linked by ester bonds.

It is contemplated that alkylation efficiency is positively correlated to the surface areas of the biomass available to the chemical reactions taking place during the processes disclosed herein. In this regard, algae can be directly used because they are single-celled and have very high available surface area. Higher level plants may be chopped and/or crushed into a fine powder, for example, prior to introduction into the processes disclosed herein, in order to increase the available surface area. It is recognized that for each type of plant processed, the processing can be optimized for higher yields of fatty acid alkyl esters from the processes disclosed herein. It is also recognized that more than one plant, or biomass from a plant, can be used as feedstock to the reactor. The biomasses can be mixed before introduction introduced individually into the reactor to be reacted together. It is also contemplated that one individual type of biomass can be the feedstock.

Methods for determining the content of one or more fatty acid alkyl esters in a mixture are well known in the art and otherwise set forth herein. See, for example, the references U.S. Pat. Nos. 5,525,126; 6,855,838; and 6,965,044 and U.S. Patent Application Publication Nos. 2007/0048848 and 2003/0158074. Accordingly, the yield of one or more fatty acid alkyl esters resulting from the processes disclosed herein can be readily determined, alone or in combination with one or more well-known methods, such as those described in the cited references.

The biomass may be used wet, but it is recognized that drying without extracting the oil increases the yield of FAAEs. Even though dried algae may be an ideal choice to feed the reactor considering the ease of use and probable higher biofuel production, the drying procedure, takes time.

The drying procedure may also require energy if freeze-drying is used. Lipids can also be degraded if the algal matter is left exposed to air too long.

Glyceride based oil may be used as a feed stock for the methods disclosed herein. The glyceride based oil may be vegetable oils from a wide variety of oil seeds and plant or plant biomasses that have been conventionally studied in an effort to obtain biofuel. Non-limiting examples of such plants are corn, soybeans, sunflower, olive, rapeseed, wheat, sugar beet, sugar cane, jatropha, palm, sorghum, cassava, hemp, algae and the like. The oil is extracted from the plants or biomasses by conventional means known to those skilled in the art. Animal fats containing glycerides can also be used as a glyceride based oil feed stock. Used cooking oil can also be used as the feed stock.

As used herein, "feed stock" encompasses biomass as defined herein, including all of the examples provided, glyceride based oils from plants, glyceride based oils from animal fat and used cooking oil. Other feed material that would react to produce similar products is also contemplated herein as feed stock.

The feed stock 10 is fed to the reactor 30 by means well-known in the art. The feed stock 10 may be conveyed, augured or sprayed, for example. The reactor 30 may be of any type known in the art that can operate at the temperatures required. The configuration of the reactor 30 in FIG. 1 is not consequential and is only an example of reaction chambers that may be utilized.

Transesterification occurs in the reactor 30. Transesterification is the process of exchanging the alkoxy group of an ester compound with another alkoxy group. The biomass contains glycerides that undergo hydrolysis in the reactor during transesterification. The glycerides may be mono-, di- or triglycerides. The ester links are severed during hydrolysis, producing free fatty acids.

The transesterification process continues with the alkylation of the freed fatty acids. Methylation in particular refers to the alkylation process used to describe the delivery of a $CH_3$ group. The alkylation agent can be a strong base that is a donor of methyl groups, such as tetramethylammonium hydroxide (TMAH). TMAH salt is available as a dry solid or mixed with a solvent like methanol or water. However, the methyl groups for this high temperature hydrolysis and esterification do not originate from the methanol solvent but from the TMAH that decomposes at these temperatures and provides a source of methyl groups for the process.

A non-limiting example of other alkylation reagents 20 used in the embodiments disclosed herein include tetrabutylammonium hydroxide, trimethylphenylammonium hydroxide, tetraethyammonium hydroxide, (m-trifluoro-methylphenyl)trimethylammonium hydroxide, mixtures thereof and the like.

TMAH is a quaternary ammonium salt that transesterifies the biomass in one step. It can hydrolyze triglycerides and methylate the fatty acids simultaneously at the proper temperature, thus directly producing fatty acid methyl esters, or FAMEs, the essential biofuel component.

In addition to producing biofuel, the glyceryl backbone of the glycerides can be methylated to produce glycerol-related methoxy ethers, for example, as another commercially usable product. These products may include 1,2,3-trimethoxy-propane (TMP), 1,3-dimethoxy-2-propanol (DMP), 1,2-dimethoxy-3-propanol (2DMP), 1,2-dihydroxy-3-methoxy propane (MDP). Byproducts can include water, trimethyl amine, methanol or other water soluble compounds that can be separated from the biofuel. These byproducts can be recovered and recycled or used in downstream processes.

TMAH thermally decomposes to trimethyl amine plus methyl groups in the following equation:

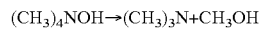

The methyl groups for this high temperature hydrolysis and esterification process originate from the TMAH that decomposes at these temperatures and provides a source of methyl groups for the process. The trimethyl amine (TMA) by-product to which the TMAH is converted may be recycled and converted back to TMAH. As an example, the TMA can be reacted with methyl chloride gas in water to produce tetramethylammonium chloride (TMAC) as disclosed in U.S. Pat. No. 4,845,289. Methanol reacts with hydrochloric gas to produce methyl chloride and the methyl chloride reacts with TMA to produce TMAC. The TMAC can be passed through an anion exchange resin (OH form) to convert the TMAC to TMAH.

Figure 2A:
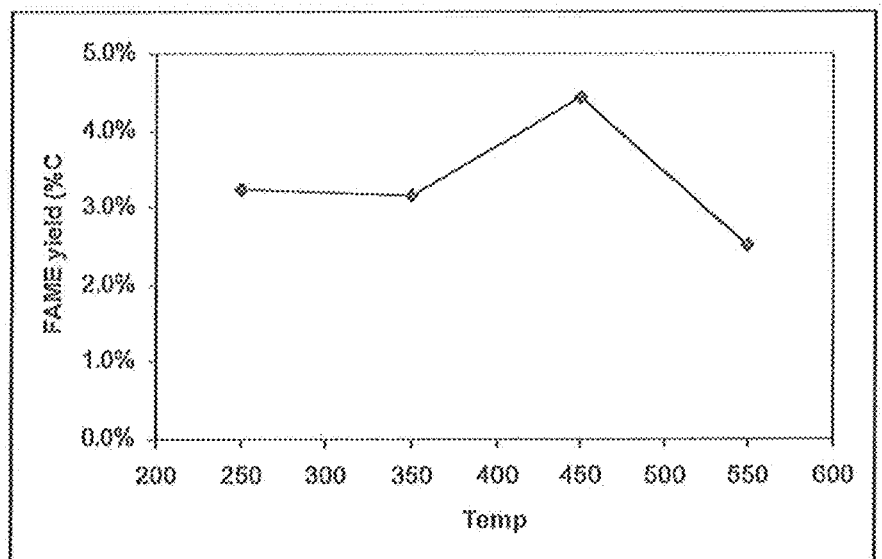
FIGS. 2A and 2B show the fatty acid methyl ester yield.

FAAE yields are affected by the amount of alkylation reagent added to the reactor. FIG. 2A depicts the FAME yield based on differing amount of the methylation reagent TMAH added to the reactor feed stock. The results indicate in FIG. 2A that 0.6 ml of the TMAH used, which as TMAH in 25% methanol, is equivalent to 0.12 g TMAH, yielded 5% FAME. The methyl groups for this high temperature hydrolysis and esterification process do not originate from the methanol solvent but from the TMAH that decomposes at these temperatures and provides a source of methyl groups for the process. As indicated, greater or lesser quantities of TMAH produced lower yields. These yields were determined using one gram of dried algal biomass.

The transesterification takes place in a substantially oxygen free environment. As used herein, "substantially oxygen free environment" means that the oxygen content of the gaseous environment of a reaction, such as the transesterification reaction in the processes disclosed herein, is reduced compared to the oxygen content of air. Thus, substantially oxygen free environment contemplates any amount of such reduction, including reduction of the oxygen to non-detectable levels. In this regard, substantially oxygen free environment also contemplates that there may be residual oxygen remaining in the system. To achieve the substantially oxygen free environment, the reactor can be purged with an inert gas using well known means to reduce oxygen. Oxygen may also be reduced by preheating the reactor to the operating temperatures, thereby burning off the oxygen in the system. It is contemplated that the reduction in the oxygen is positively correlated to the amount of desired fatty acid alkyl ester yield. Thus, maximum reduction in the oxygen content results in higher yields of fatty acid alkyl ester. The optimal amount of the reduction of oxygen is determinable by monitoring the fatty acid alkyl ester yield from the processes of the invention by the methods described herein. In other words, the desired yield can be compared under any substantially oxygen free environment and compared to the yield of transesterification under air. In one embodiment, the oxygen content of the gaseous environment of the transesterification reaction is selected from less than: 20%, 19%, 18%, 17%, 16%, 15%, 14%, 13%, 12%, 11%, 10%, 9%, 8%, 7%, 6%, 5%, 4%, 3%, 2%, 1% and undetectable amounts of the total. In another embodiment, the oxygen content is selected from less than 5%, 4%, 3%, 2%, 1% and undetectable amounts of the total. In another embodiment, the oxygen content is selected from less than 2% of the total. In another embodiment, the oxygen content is essentially zero, meaning it is undetectable.

The transesterification takes place under ambient pressure conditions. This reduces the cost of the process and increases the simplicity of the process. However, it is contemplated that the pressure can be reduced to less than ambient, allowing for a further reduction in operating temperature. It is also contemplated that the pressure may be increased to allow for a more efficient control of reactor conditions and product collection. The optimal amount of the reduction in pressure and/or temperature is determinable by monitoring the fatty acid alkyl ester yield from the processes of the invention by the methods described herein.

Figure 2B:
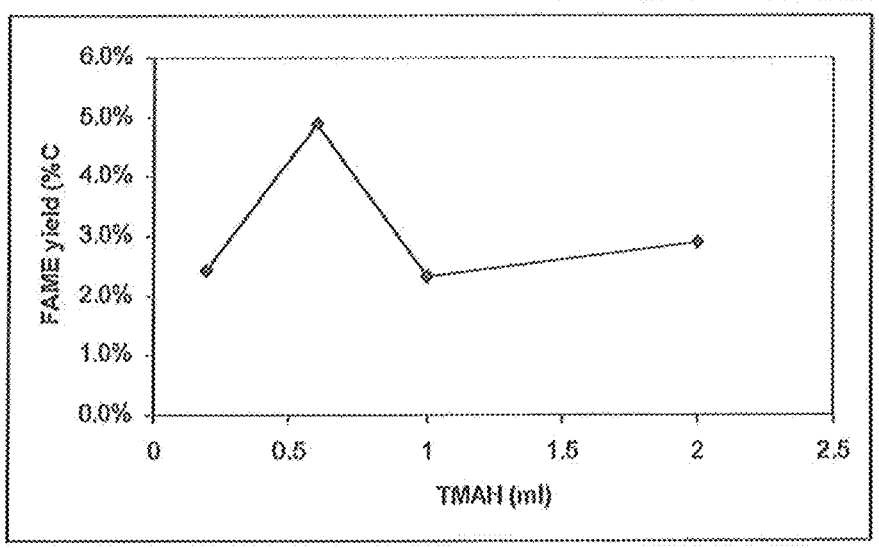

The transesterification occurs at a temperature sufficient to hydrolyze one or more lipid glycerides in the biomass and alkylate one or more fatty acids in the reaction. Referring now to FIG. 2B, the yield of FAMEs produced from this process using an algal biomass as a feed stock is graphed against the temperature at which the reaction was run. The results indicate that the yields of FAMEs produced at temperatures of 250 and 350° C. were about the same, approximately 3.2%. The yield was the highest (4.43%) at 450° C., and the lowest at 550° C. The low yield at 550° C. indicates that some of the FAMEs might be degraded at the higher temperature. It should be noted that although 450° C. achieves the optimum biofuel yield in this particular process embodiment and at atmospheric conditions, lower temperatures may be used to provide suitable yields under different conditions, such as at pressures below atmospheric. Further, economics and energy requirements may make a lower temperature more favorable depending on the associated product yield. It should be noted that product yield, measured by methods discussed herein, may be optimized by varying at least one of temperature, pressure, and oxygen level. Therefore, in one embodiment, it is contemplated that temperatures as low as 100° C. will produce the desired yield when at least one of pressure and oxygen level is adjusted. In another embodiment, the temperature is selected from the following ranges: 100° C. to 550° C.; 150° C. to 500° C.; 200° C. to 450° C.; 250° C. to 400° C.; and 300° C. to 350° C.

Figure 3:
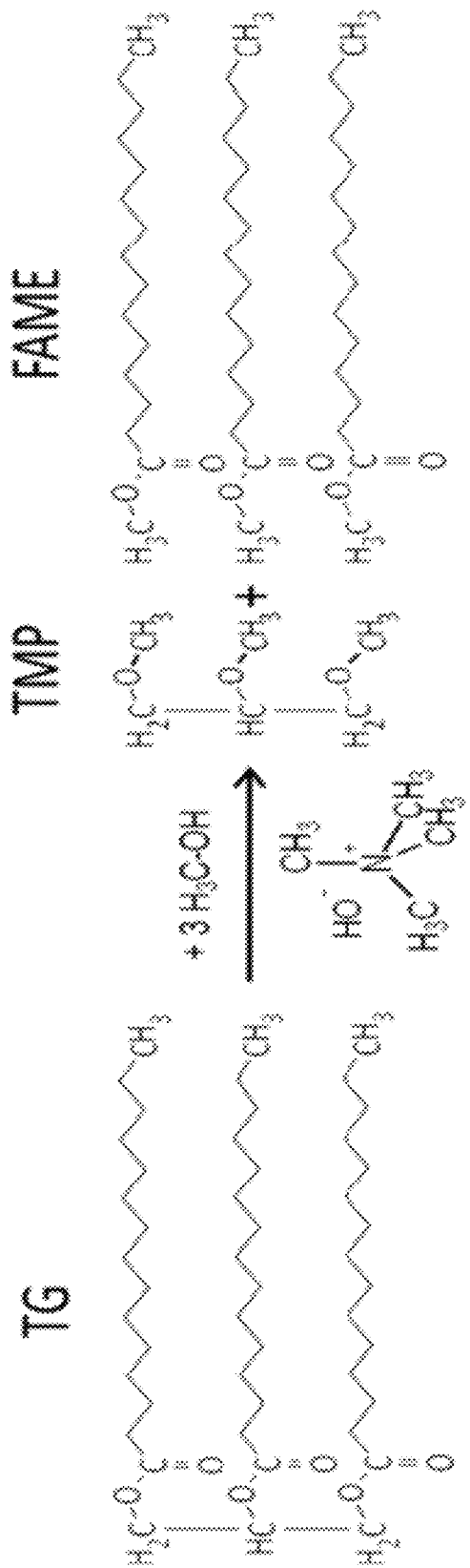
FIG. 3 illustrates the reaction of methylation of triglycerides involving the production of 1,2,3-trimethoxy propane (TMP) and biofuel (FAMEs)
Figure 4:
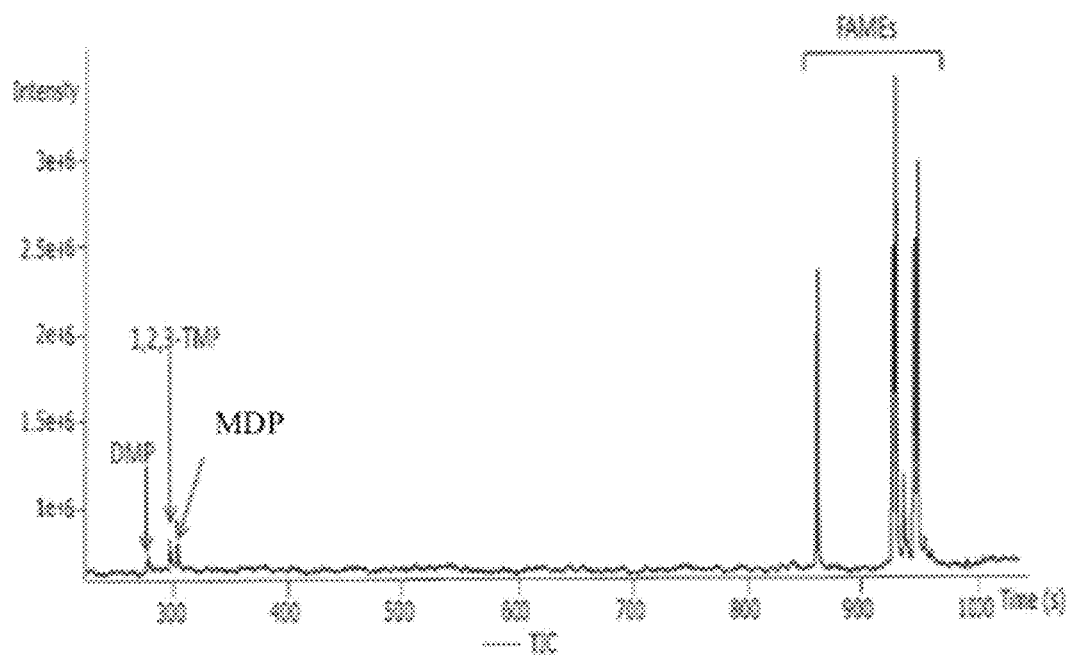
FIG. 4 is a chromatogram of condensed product obtained using the process disclosed herein to produce fatty acid methyl esters (FAMEs), 1,3-dimethoxy-2-propanol (DMP), 1,2,3-trimethoxypropane (1,2,3-TMP) and 3-methoxy-1,2-dihydroxypropane (MDP) mixed with a small amount of 2DMP.

The feed stocks herein can selectively produce high value glycerol-related co-products such as 1,2,3-trimethoxy-propane (TMP), 1,3-dimethoxy-2-propanol (DMP), 1,2-dimethoxy-3-propanol (2DMP), and 3-methoxy-1,2-dihydroxypropane (MDP). FIG. 3 illustrates the yields of FAME biofuel and 1,2,3-trimethoxy-propane (TMP) from the conversion process herein. As noted, during transesterification, the glycerides of the oil undergo hydrolysis in the reactor during transesterification. The glycerides may be mono-, di- or triglycerides. The ester links are severed during hydrolysis, producing free fatty acids. Co-products such as mono- or 1,3-dimethoxy-2-propanol (DMP) and a compound we identify by mass spectrometry as 3-methoxy-1,2-dihydroxypropane (MDP) mixed with a small amount of 2DMP may be formed, when, for example, the biomass or oils contain diglycerides in addition to the triglycerides, which is shown in FIG. 4. This reaction is instantaneous if subjected to elevated temperatures under a nitrogen atmosphere containing less than 1% oxygen.

The methylated glycerol-related co-products can be purified and used in various applications. TMP can be used, for example, for the synthesis of polish, as a cryoprotective agent for prevention of ice formation during cooling of vascular tissues and organs, for the synthesis of optical immersion oil, or as a fuel additive.

Examples are presented below. The examples are intended only to further illustrate the embodiments disclosed herein and are not intended to limit the scope of the invention as defined by the claims.

An algal biomass was collected from the effluent of a local wastewater treatment facility. This algae sample, dominated by diatoms as detected under microscope, was collected from the surface of the water and air dried. Another algal sample was collected from a local lake using ultrafiltration. Briefly, 60 L of water from the lake was concentrated to about 60 mL using tangential flow filtration with a 0.2 μm membrane. The concentrated algae sample was freeze dried. This sample consisted mainly of Pennate diatoms and *Cryptomonas* sp, as observed under a microscope.

To prepare the algae for the chemoreactor, 1-2 grams of dried algae was mixed with 1 ml TMAH (25% in methanol). It should be noted that TMAH (25% in water) can also be used. Tests indicate the yield with TMAH in methanol is higher than that with distilled water, suggesting that both the TMAH and methanol are directly involved the alkylation process. The methanol may be involved during the low-temperature ramp-up of the reactor through a conventional transesterification.

TMAH and FAME standards were obtained from Sigma. The mixture was evaporated to near dryness or dryness under nitrogen over a period of 2 hours and was loaded into an appropriate heating furnace (reactor) that may be programmed or set for temperature control. The reactor used was manufactured by Thermo Electron, model Lindberg Blue M, PF55035A-1. The temperature was ramped from room temperature to 450° C. in 15 min, and then was held for 30 min before cooling down to room temp. Nitrogen swept the reactor and condenser at ambient pressure at a flow rate of 20 ml/min. The volatile products including the biofuel were condensed using an ice-cold trap (condenser). The top layer of the condensed fluid in the trap can be taken directly as the biofuel product.

After being filtered through glass wool, the biofuel collected from the chemoreactor was injected into Gas chromatography coupled to time-of-flight mass spectrometry GC-TOF MS (LECO Pegasus III) using the splitless mode. The analyses were carried out with an autosampler (CTC Analytics) integrated to the GC system (Agilent Technologies, 6890N) fitted with a 30 m×0.25 mm i.d. capillary column (0.25 μm film of 5% diphenyl-95% dimethyl polysiloxane). Helium gas was used as a carrier gas, and the temperature was ramped from 50 to 300° C. at 15° C. min$^{-1}$ following injection. The select mass ion m/z 74 was used to quantify the amount of FAME in the samples based on both internal and external standards added (tetracosane) according to Frazier S. W., Nowack K. O., Goins K. M., Cannon F. S., Kaplan L. A., and Hatcher P. G., *Characterization of organic matter from natural waters using tetramethylammonium hydroxide thermochemolysis GC-MS*, J. ANALYTICAL & APPLIED PYROLYSIS, 70(1), 99-128 (2003). Using the direct conversion process disclosed herein in the chemoreactor, FAME content from the algal biomass sample is about 3% of biomass. This yield is comparable with the conventional fatty acid analysis of microalgal samples, suggesting an excellent efficiency for biofuel transformation. See Mansour M. P., Frampton D. M. F., Nichols P. D., Volkman J. K., Blackburn S. I., *Lipid and fatty acid yield of nice stationary-phase microalgae: Applications and unusual C24-C28 polyunsaturated fatty acids*, J. OF APPLIED PHYCOLOGY, 17, 287-300 (2005).

A comparison was done of the biofuel derived from the algal biomass with biofuels derived from other plants and supplied commercially. The gas chromatography coupled to time-of-flight mass spectrometry (GC-TOF MS) was used to compare the chemical constituents in biofuel products from the algal biomass with two biofuel standards available commercially from Houston Biofuel. One of the biofuel samples was made from palm oil (palmitic acid), and the second one was made from soybean and chicken oil. Both the palm oil and soybean oil biofuels were produced using the conventional transesterification involving sodium hydroxide and methanol. FIGS. 5A and 5B show the analytical ion chromatograms (AIC) of a biofuel sample derived from algal biomass and the biofuel standard derived from soybean oil, respectively.

As seen in FIG. 5A, the biofuel sample from the algal biomass was dominated by FAMEs of C16:0 (saturated fatty acid with 16 carbons) and C16:1 (singly unsaturated fatty acid with 16 carbons), accounting for 64% of the total FAMEs. The peak at 1045 s in the chromatogram is the internal standard added for quantification purposes (tetracosane). FAME C14:0 and C18:1 accounted for 33% of the total area, followed by a minor component of C18:0 with 3%.

As seen in FIG. 5B, the biofuel from soybean oil showed similar composition with the sample, mainly containing C16: 0, C18:0 and C18:1. Interestingly, acetic acid butyl ester at 260 s was also detected in the soybean biofuel. The biofuel derived from palm oil had a similar pattern as that from soybean oil (data not shown).

In additional experiments, tetraethylammonium hydroxide and tetrabutylammonium hydroxide (25% in methanol) were used as the alkylation reagent. These two reagents were tested under the same conditions as those used with the TMAH, using dried algae from the same source. These two reagents convert triglycerides to fatty acids ethyl esters and fatty acid butyl esters, respectively. Similar to TMAH, the dominant products are the ethyl or butyl esters of C14:0, 16:0 and 18:0 fatty acids. It should be noted, however, that the quality of ethyl or butyl esters may not be as good as the FAMEs because they are less volatile, which may make the combustion in the engine more difficult than FAMEs.

FAMEs yields were also tested with commercially available soybeans, corn oil, olive oil and sunflower oil. The soybeans were ground in a mortar and pestle, and 1 g of ground soybeans was loaded to the chemoreactor for biofuel conversion. To obtain FAMEs from vegetable oils, only a small amount of vegetable oil is needed. A mini-reactor was used consisting of glass tubes as described by Chefetz B., Chen Y., Clapp C. E., Hatcher P. G., *Characterization of organic matter in soils by thermochemolysis using tetramethylammonium hydroxide (TMAH)*, SOIL SCI. SOC'Y OF AMN. J., 64 (2), 583-589 (2000). The FAME yields from the algae samples are similar (3-6%), whether the chemoreactor or the glass tubes are used, so the conversion of vegetable oil in the glass tubes is expected to be equivalent to that expected in the chemoreactor. Briefly, 2 μL of vegetable oil was mixed with 200 μL TMAH (25% in methanol). After the methanol was evaporated under $N_2$, the glass tube was sealed under vacuum. The glass tube was put in a furnace at 250° C. for half an hour. The FAMEs in the tube were rinsed out with ethyl acetate for GC-MS analysis.

The soybeans generated 2.2% FAMEs. This yield appeared to be low considering the high lipid contents in soybeans, about 20%. It is contemplated that the reason for the low yield is the use of the mortar and pestle, resulting in a coarse powder, effectively reducing the surface area of ground soy beans available to react. The corn, olive and sunflower oil were each converted to FAMEs resulting in a higher efficiency, ranging from 88-140%. This higher efficiency is expected because vegetable oil is miscible with TMAH in methanol. Therefore, the available surface area for the reaction is much higher, resulting in much higher conversion efficiency than that of the solids.

The overall similar mass spectrometry patterns between biofuels available commercially and the biofuel produced from the algal biomass suggest that the direct conversion process employed in the subject disclosure yields a nearly identical biofuel to those available commercially. The procedure is robust and does not require extensive processing like that for the traditional process. It is a direct transesterification from solid to liquid biofuel products, as well as liquid to liquid biofuel products.

The mixture of biofuel and methylated glycerol products presents an interesting challenge for separation and purification, especially in cases where methanol is also present in the condensate from the reaction. The methylated glycerols act together or separately to cause gel formation with the FAMEs once methanol is removed by distillation. Thus, attempts to utilize distillation for isolation and purification of the mixture, either on-line with the high-temperature alkylation process or off-line, will not be successful because a solid gel forms in the bottom of the distillation reservoir, preventing further distillation and separation of the methoxylated glycerols from each other and from the FAMEs.

Figure 6:
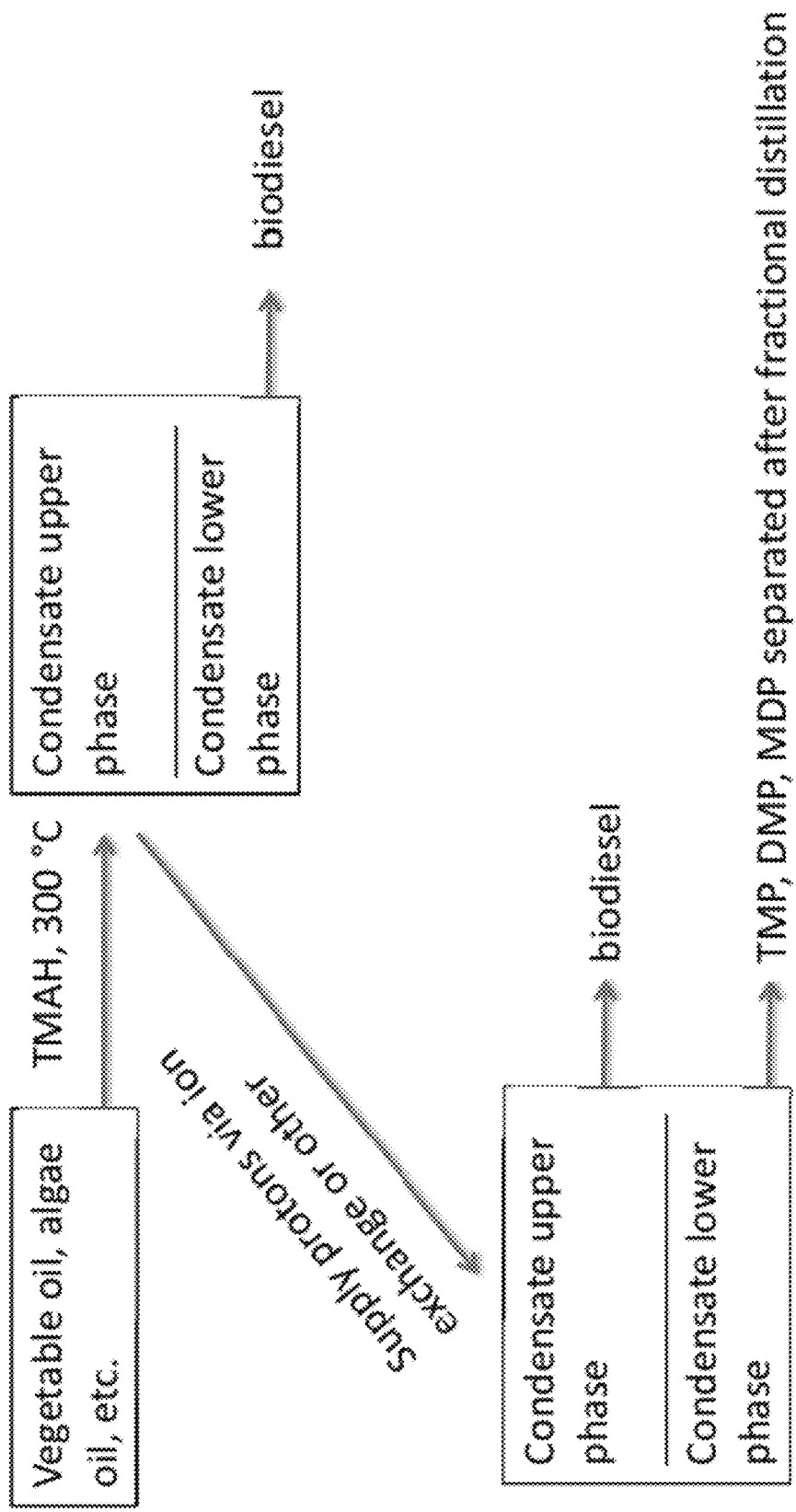
FIG. 6 is a separation schematic for the process disclosed herein.

Disclosed herein is a process to separate the methoxylated glycerols as a group from biofuel such that they can be subjected to standard distillation practices for isolation and purification. As shown in FIG. 6, the biofuel is also purified as the methoxylated glycerols are removed in the process.

The condensate recovered from the transesterification separates into two liquid phases. The lower phase (higher density) is mainly FAMEs or biodiesel. The upper phase (lower density) is the mixture of methanol, TMP, DMP, MDP, and FAMEs. A chromatogram of the upper phase is shown in FIG. 7A. This upper phase is removed and treated with anhydrous/hydrous acid (anhydrous/hydrous HCl, concentrated $H_2SO_4$, or cation exchange resin in the $H^+$ form, as non-limiting examples) whereupon it separates into two phases. The upper phase (lower density) is FAMEs or biodiesel dissolved in methanol and the lower phase (higher density) is mainly the mixture of methylated glycerols (TMP, DMP, MDP) dissolved in methanol, as seen in FIG. 7B. The methanol can now be removed from both phases by standard distillation. The upper phase yields mainly FAMEs or biodiesel (some residual methoxylated glycerols can be present) and the lower phase yields a mixture of methoxylated glycerols which can be further separated from each other into the individual glycerols TMP, DMP, MDP by standard fractional distillation.

The production and isolation of high-value products such as the methoxylated glycerols (TMP, DMP, MDP) will provide a means to increase the economic value for biodiesel production from plant and animal fats. These products have been suggested as fuel additives for gasoline, for example. TMP can be used, for example, for the synthesis of polish, as a cryoprotective agent for prevention of ice formation during cooling of vascular tissues and organs, for the synthesis of optical immersion oil, or as a fuel additive.

The conventional method for converting the glycerides of biomass to FAME (fatty acid methyl ester) biodiesel is reacting the glycerides of the biomass with methanol in the presence of a base catalyst, usually sodium hydroxide, at temperatures not exceeding 100° C. In this reaction, the three-carbon backbone of triglycerides is converted to glycerol (1,2,3-trihydroxypropane). Large-scale production of biodiesel by this approach has and will lead to large excesses of crude glycerol that currently has very little value in commercial markets. As used herein, "crude glycerol" is the glycerol by-product from the conventional process of producing biofuel from biomass and can contain traces of fatty acids, soaps, catalyst, and the like.

The methods disclosed herein can also use an alkylation reagent to methylate crude glycerol directly. Glycerol from other sources than crude glycerol can also be methylated with the methods herein. Using glycerol or crude glycerol as the feed stock for the reaction produces a series of methoxylated glycerols (TMP, DMP, and MDP), without the need for the separation process disclosed herein unless the crude glycerol provided has residual biofuel in amounts sufficient to warrant separation.

As a non-limiting example, methoxylated glycerols can be produced directly from glycerol or crude glycerol using TMAH in a one-step methylation reaction at slightly elevated temperatures (200-500° C.) under substantially oxygen free conditions at ambient pressures. This reagent mixed with glycerol, or crude glycerol from a biodiesel production stream, methylates the glycerol to form TMP, DMP, and MDP. The following is the general reaction regime:

Glycerol+Alkylation Reagent=Alkyl ethers

In addition to being an alkylation reagent to produce biofuel from the feed stocks disclosed herein, TMAH can methylate glycerol in one step. Along with the glycerol, any residual fatty acids in the crude glycerol stream remaining from the biofuel production process can be methylated to generate fatty acid methyl esters, or FAMEs, the essential biofuel component. The methylated glycerol products may include 1,2,3-trimethoxy propane (TMP), 1,3-dimethoxy-2-propanol (DMP) and 1,2-dihydroxy-3-methoxy propane (MDP). TMAH thermally decomposes to trimethyl amine (TMA) plus methanol in the following equation:

$(CH_3)_4NOH \rightarrow (CH_3)_3N + CH_3OH$

The TMA by-product from which the TMAH is converted may be recycled and converted back to TMAH. As an example, the TMA can be reacted with methyl chloride gas in water to produce tetramethylammonium chloride (TMAC) per U.S. Pat. No. 4,845,289. Methanol reacts with HCl gas to produce methyl chloride and the methyl chloride reacts with TMA to produce TMAC. The TMAC can be passed through an anion exchange resin (OH form) to convert the TMAC to TMAH.

Other alkylation reagents include tetrabutylammonium hydroxide (TBAH), tetraethylammonium hydroxide (TEAH), and tetrapropylammonium hydroxide (TPAH). The use of each of these would result in formation of ethylated glycerols for TEAH, propylated glycerols for TPAH, and butylated glycerols for TBAH. For TEAH the products may include 1,2,3-triethoxy propane (TEP), 1,3-diethoxy-2-propanol (DEP) and 1,2-dihydroxy-3-ethoxy propane (EDP). For TPAH the products may include 1,2,3-tripropoxy propane (TPP), 1,3-dipropoxy-2-propanol (DPP) and 1,2-dihydroxy-3-propoxy propane (PDP). For TBAH the products may include 1,2,3-tributoxy propane (TBP), 1,3-dibutoxy-2-propanol (DBP) and 1,2-dihydroxy-3-butoxy propane (BDP).

Examples are presented below. The examples are intended only to further illustrate the embodiments disclosed herein and are not intended to limit the scope of the invention as defined by the claims.

Figure 8:
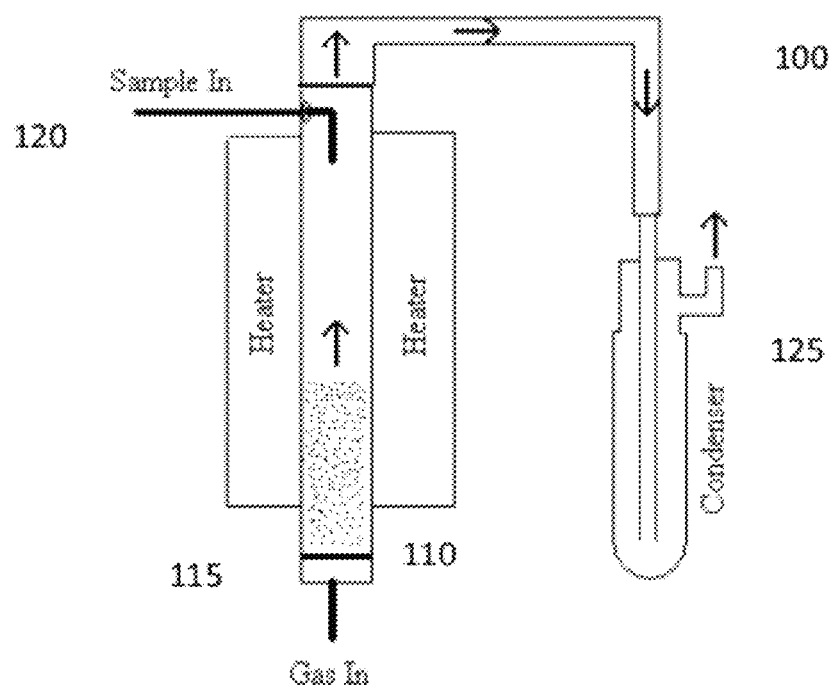
FIG. 8 is a schematic diagram of fluidized bed reactor.

The diagram of a fluidized bed reactor 100 is shown in FIG. 8. The fluidized bed reactor 100 is an example of a reactor in which the processes disclosed herein can be run. In one example, the fluidized bed reactor 100 is prepared by adding approximately 30 grams of clean sand 110 to be fluidized. Inert gas 115, typically helium or nitrogen, is passed through the reactor 100 at approximately 60 mL/min to fluidize the sand 110 before injecting the sample 120. The sample 120 is prepared by mixing glycerol with TMAH (25% in methanol) or another alkylating agent in a 1:3 molar ratio with a slight excess of TMAH. Once mixed, the sample 120 can be injected in a continuous feed mode. The sample 120 reacts in the fluidized sand bed and the volatile products are condensed using a condenser 125.

Additional reactions were performed under vacuum. An amount of glycerol is placed in a tube reactor with 25% TMAH in methanol. The tube reactor is then connected to a vacuum line where any excess vapor is removed via the vacuum. Under vacuum the tube reactor is flame sealed using a propane oxygen torch before being placed in an oven to cause the reaction to occur. The reaction is complete within two minutes. The tube reactor is removed from the oven and allowed to cool before being opened. The sample can then be taken up using a suitable solvent such as methanol.

Figure 9:
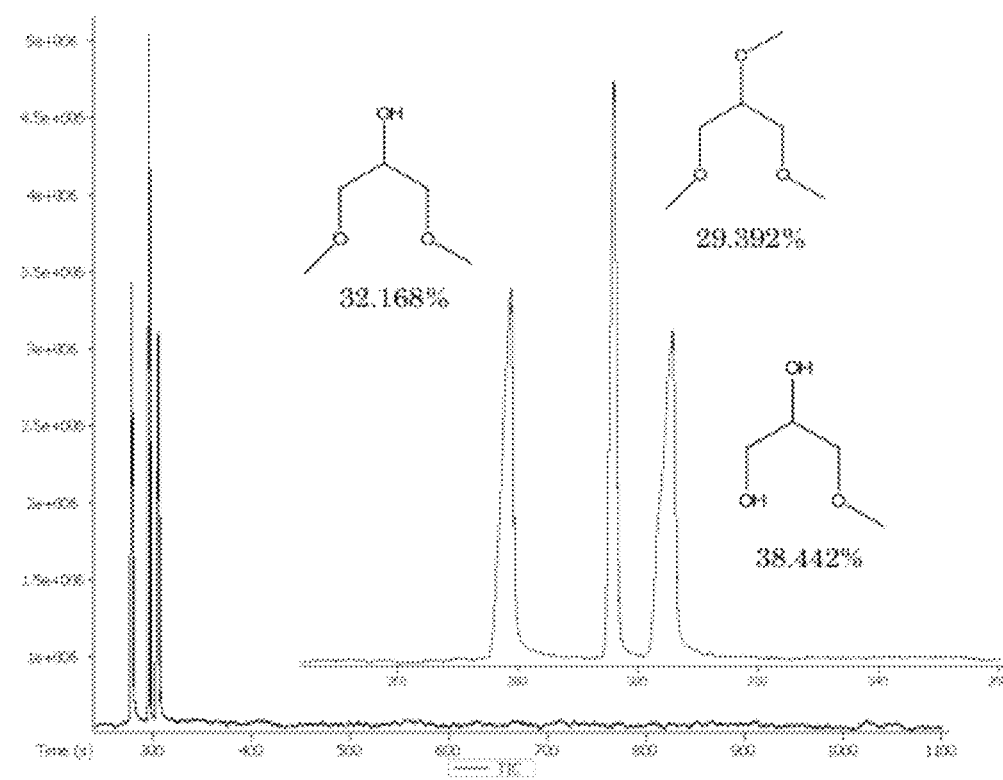
FIG. 9 is a GCMS total ion chromatograph of the product from the fluidized bed reactor of FIG. 8.

The methoxylated products collected from the fluidized bed reactor 100 and vacuum tube reactor were injected into a gas chromatograph (GC) mass spectrometer (MS) (LECO Pegasus III) using the split mode. The analyses were carried out with an autosampler (CTC Analytics) integrated to the GC system (Agilent Technologies, 6890N) fitted with a 30 m×0.25 mm i.d. capillary column (0.25 μm film of 5% diphenyl-95% dimethyl polysiloxane). Helium gas was used as a carrier gas, and the temperature was ramped from 50 to 300° C. at 15° C. min$^{-1}$ following injection. Analyses show complete conversion of glycerol to methoxylated products with no detectable starting material remaining, as shown in FIG. 9.

A series of tests were conducted to determine the optimal conditions for the conversion of glycerol to methoxylated glycerols. The effects of temperature of the reactor were tested, as well as serial additions of alkylating reagent on product distribution and the need for methanol.

Figure 10:
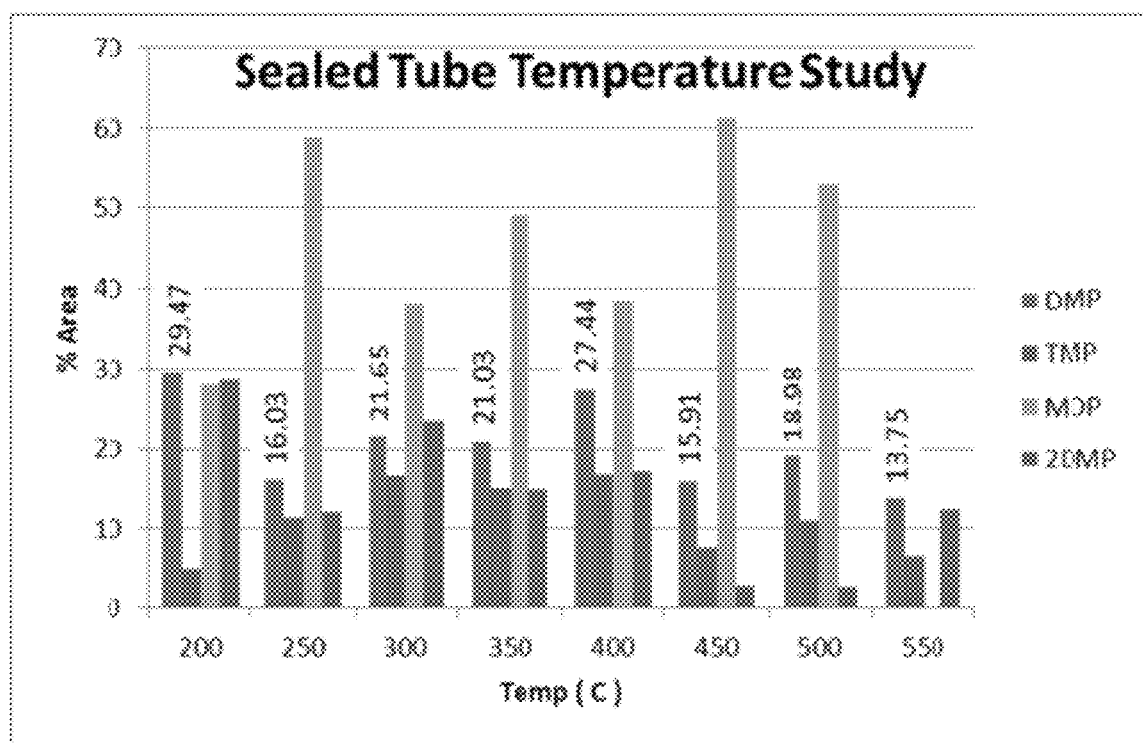
FIG. 10 is a graph showing GC-MS area percentages of 1,3-dimethoxy-2-propanol (DMP), 1,2,3-trimethoxy propane (TMP), 1,2-dihydroxy-3-methoxy propane (MDP), and 1,2-dimethoxy-3-propanol (2DMP) produced over a temperature range.

Keeping the concentrations of glycerol and 25% TMAH in methanol constant, the heating temperature was varied for a series of sealed tube reactors to examine the effect temperature has on product distribution, the results of which are shown in FIG. 10. Products were run on a GC mass spectrometer and area percentages of methoxylated products were compared at 200, 250, 300, 350, 400, 450, and 550° C. Each reaction was prepared the same way and ran the same way. The results show that at temperatures below 250° C. the reaction proceeds in the heated GC injection port rather than the sealed tube. Additionally at temperatures above 500° C. there is likely a breakdown of alkylated products as there is a noticeable decline in all area percentages. The data suggests that the optimal temperature for the formation of TMP is between 300-400° C. as temperatures outside of this range saw decreasing values of all products.

Figure 11A:
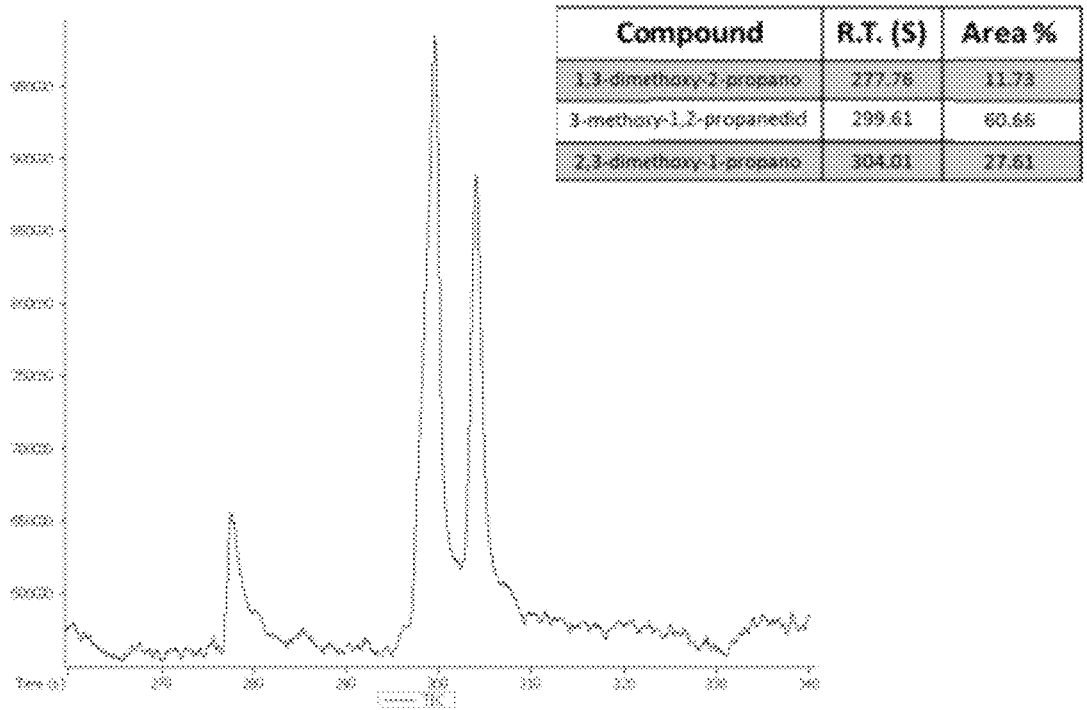
FIG. 11A is a GC-MS chromatogram and area percentage for the reaction of equimolar glycerol with TMAH.
Figure 11B:
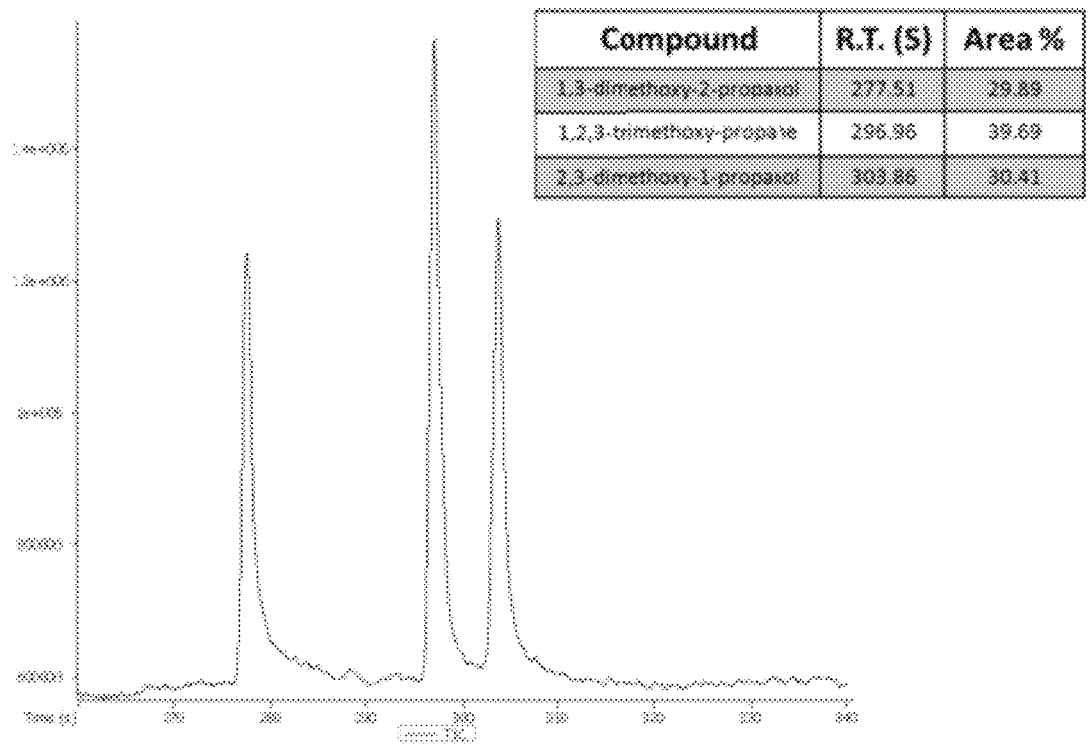
FIG. 11B is a GC-MS chromatogram and area percentage for the reaction of the product from FIG. 11A with an additional equimolar amount of TMAH.
Figure 11:
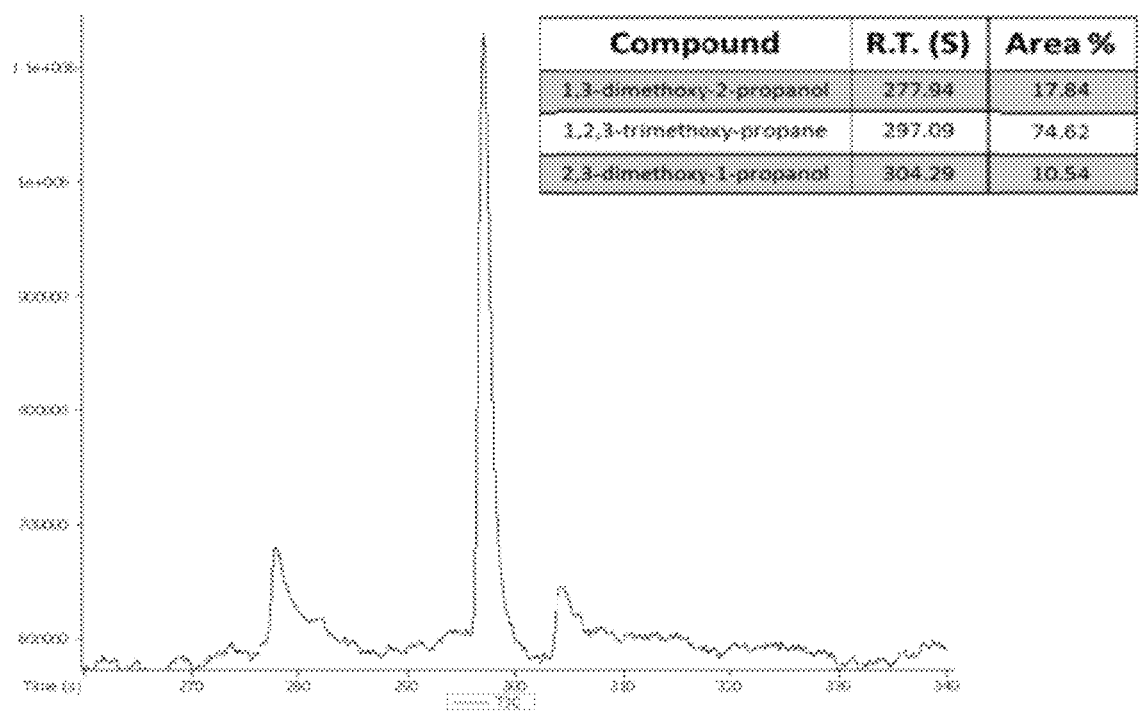
FIG. 11C is a GC-MS chromatogram and area percentage for the reaction of the product from FIG. 11B with an additional equimolar amount of TMAH.

In addition to temperature, methoxylated product distribution can be affected by the amount of TMAH added to the glycerol sample. FIG. 11A shows that equimolar amounts of TMAH and glycerol will result in the formation of mainly the mono substituted 3-methoxy-1,2-propanediol (MDP) product. Addition of another equimolar amount of TMAH to that product (1:2 glycerol TMAH) results in mainly disubstituted 1,3-dimethoxy-2-propanol (DMP) and 1,2-dimethoxy-3-propanol (2DMP) products, as shown in FIG. 11B. Adding another molar equivalent of TMAH to that (1:3 glycerol TMAH) results in the formation of mainly trisubstituted 1,2,3-trimethoxy propane (TMP) product, as shown in FIG. 11C. This data suggest that with increased concentrations of TMAH the more substituted products will become favored. Additionally, when compared to FIG. 10, which used a 1:3 ratio of glycerol to TMAH from the start, the serial addition of TMAH seems to result in greater conversion to 1,2,3-trimethoxy propane.

Figure 12:
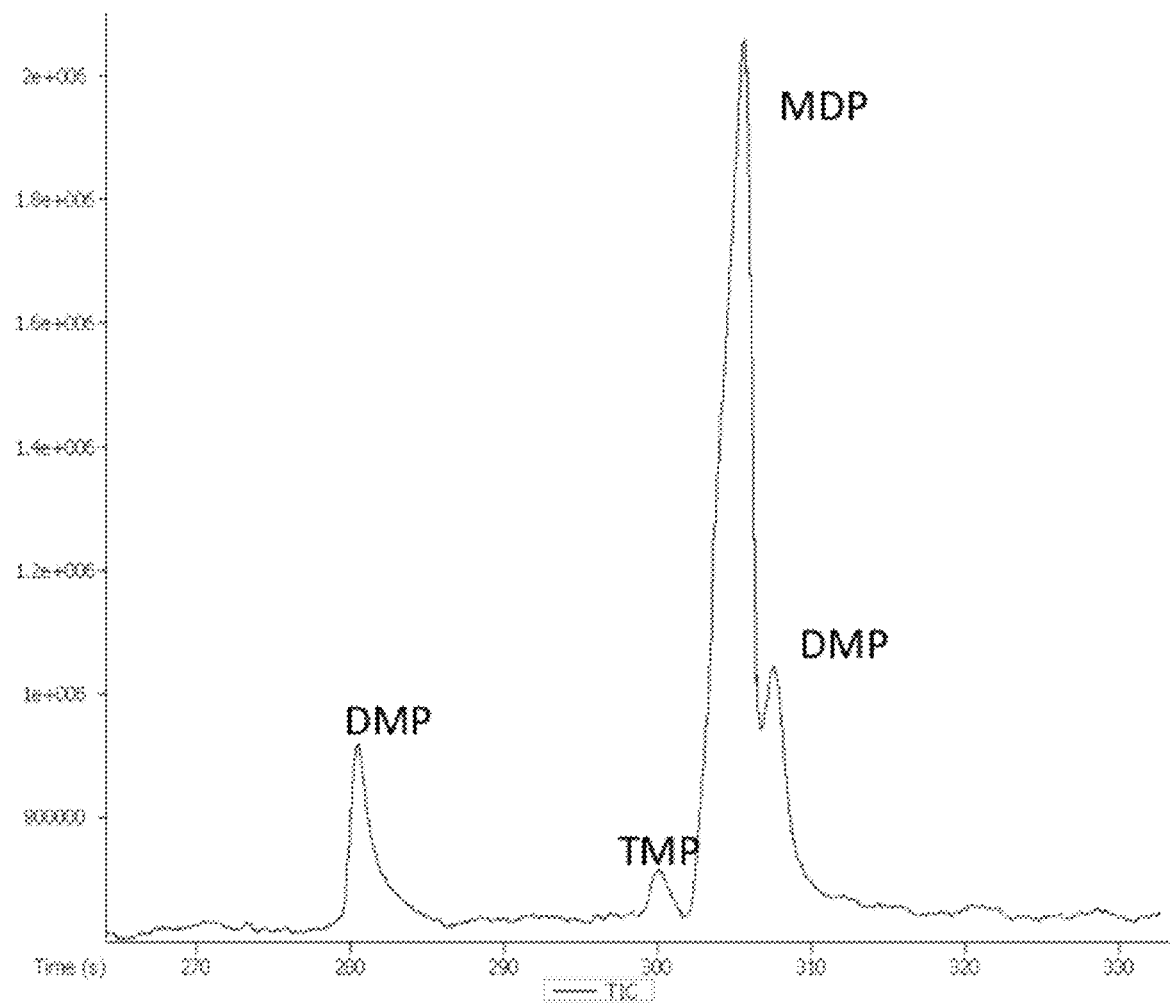
FIG. 12 is a GC-MS showing the production of 3-methoxy-1,2-propanediol (MDP), 1,3-dimethoxy-2-propanol (DMP), 1,2-dimethoxy-3-propanol (2DMP), and 1,2,3-trimethoxy propane (TMP) along with an excess of glycerol.

To test the need for methanol in the reaction, sealed tube reactions were conducted using glycerol and solid TMAH pentahydrate. The tube reactors were sealed and let stand at 250° C. for 20 minutes. GC-MS of the resulting product showed, as seen in FIG. 12, the production of 3-methoxy-1,2-propanediol (MDP), 1,3-dimethoxy-2-propanol (DMP), 1,2-dimethoxy-3-propanol (2DMP), and 1,2,3-trimethoxy propane (TMP) along with an excess of glycerol. As there was a large excess of glycerol it is likely that there simply was not enough TMAH present to react fully (data not shown). Accordingly, excess methanol is not needed for the reaction.

While the invention has been described in connection with certain embodiments, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law. All numerical ranges cited herein are inclusive of all values contained therein, and include both endpoints in a range.

What is claimed is:

1. A process for producing glycerol-related products comprising:
   introducing a feedstock and an alkylation reagent to a substantially oxygen free environment;
   hydrolyzing at a temperature at or above 200° C. one or more lipid glycerides in the feedstock;
   methylating one or more fatty acids in the feedstock with methyl groups from the alkylation reagent, wherein the hydrolyzing and methylating occur contemporaneously;
   separating a lower phase from an upper phase of a resulting condensate, the lower phase comprised of biodiesel;
   acidifying the upper phase;
   separating the acidified upper phase into biodiesel dissolved in methanol and methoxylated glycerols dissolved in methanol;
   removing the methanol from both the biodiesel and the methoxylated glycerols; and
   separating the biodiesel from the methoxylated glycerols.

2. The process of claim 1, wherein the alkylation reagent is tetramethylammonium hydroxide.

3. The process of claim 2, wherein the methlylated glycerol-related products are one or more of 1,2,3-trimethoxy-propane (TMP), 1,3-dimethoxy-2-propanol (DMP), 1,2-dimethoxy-3-propanol (2DMP) and 3-methoxy-1,2-dihydroxypropane (MDP).

4. The process of claim 1, wherein the temperature is between about 250° C. and about 500° C. and the pressure is atmospheric.

5. The process of claim 1, wherein the feedstock is an algal biomass.

6. The process of claim 1, wherein the feedstock is one or more of glyceride based oils from plants, glyceride based oils from animal fat and used cooking oil.

7. The process of claim 1, wherein at least one by-product of the processed alkylation reagent is converted and recycled as the alkylation reagent.

8. The process of claim 2, wherein a trimethylamine by-product of the processed tetramethylammonium hydroxide is converted and recycled as the alkylation reagent.

9. The process of claim 1, wherein the alkylation reagent is selected from one or more of tetramethylammonium hydroxide, tetrabutylammonium hydroxide, trimethylphenylammonium hydroxide, tetraethyammonium hydroxide, and (m-trifluoro-methylphenyl)trimethylammonium hydroxide.

10. The process of claim 1, wherein the substantially oxygen free environment comprises less than or equal to one percent oxygen.

11. The process of claim 1, wherein the methanol is removed with distillation.

12. A process for producing glycerol-related products comprising:
   hydrolyzing and methylating glycerol with an alkylation reagent in a substantially oxygen free environment without a catalyst, wherein the glycerol is methoxylated glycerols produced from one or more of an algal biomass and glyceride based oils.

13. The process of claim 12, wherein the glyceride based oils are glyceride based oils from plants, glyceride based oils from animal fat and used cooking oil.

14. The process of claim 12, wherein the alkylation reagent is tetramethylammonium hydroxide.

15. The process of claim 14, wherein the glycerol-related products are one or more of 1,2,3-trimethoxy-propane (TMP), 1,3-dimethoxy-2-propanol (DMP), and 1,2-dihydroxy-3-methoxy propane (MDP).

16. The process of claim 14, wherein a trimethylamine by-product of the processed tetramethylammonium hydroxide is converted and recycled as the alkylation reagent.

17. The process of claim 12, wherein the temperature is between about 250° C. and about 500° C. and the pressure is atmospheric.

18. The process of claim 12, wherein at least one by-product of the processed alkylation reagent is converted and recycled as the alkylation reagent.

19. The process of claim 12, wherein the alkylation reagent is selected from one or more of tetramethylammonium hydroxide, tetrabutylammonium hydroxide, trimethylphenylammonium hydroxide, tetraethyammonium hydroxide, and (m-trifluoro-methylphenyl)trimethylammonium hydroxide.

20. Glycerol-related products produced from the process of claim 12.

21. A process for producing glycerol-related products comprising:
   hydrolyzing and methylating glycerol with an alkylation reagent in a substantially oxygen free environment without a catalyst, wherein the glycerol is crude glycerin produced from a biodiesel production facility.

* * * * *

UNITED STATES PATENT AND TRADEMARK OFFICE
CERTIFICATE OF CORRECTION

PATENT NO. : 8,455,699 B2
APPLICATION NO. : 13/569621
DATED : June 4, 2013
INVENTOR(S) : Patrick G. Hatcher, Zhanfei Liu and Elodie Salmon It is certified that error appears in the above-identified patent and that said Letters Patent is hereby corrected as shown below:

In the Specifications

Column 1, lines 19-20 please add the following statement to the above-identified patent:

"This invention was made with government support under Contract No. DE-EE0000390 awarded by the Department of Energy. The government has certain rights in this invention."

Signed and Sealed this
Thirtieth Day of July, 2013

Teresa Stanek Rea
*Acting Director of the United States Patent and Trademark Office*